United States Patent [19]
Gracey

[11] Patent Number: 5,788,429
[45] Date of Patent: Aug. 4, 1998

[54] CARTRIDGE CASE OUTSIDE NECK SHAVER

[76] Inventor: Doyle D. Gracey, P.O. Box 155, Tehachapi, Calif. 93581

[21] Appl. No.: 675,924

[22] Filed: Jul. 5, 1996

[51] Int. Cl.⁶ .................... B23B 41/00; B23P 15/22
[52] U.S. Cl. .................. 408/80; 29/1.32; 86/23; 86/32; 408/87; 408/234
[58] Field of Search .................. 408/79, 80, 87, 408/234; 29/1.32; 86/23, 32; 82/113

[56] References Cited

U.S. PATENT DOCUMENTS

| | | | |
|---|---|---|---|
| 2,359,954 | 10/1944 | Whipple | 29/1.32 |
| 3,274,661 | 9/1966 | Westbrook | 29/1.32 |
| 3,661,472 | 5/1972 | Beauloye | 82/113 |
| 3,818,563 | 6/1974 | Beaulieu | 29/1.32 |
| 4,319,503 | 3/1982 | Saine et al. | 82/113 |
| 4,686,751 | 8/1987 | Gracey | 29/1.32 |
| 4,742,606 | 5/1988 | Burby et al. | 29/1.32 |
| 5,415,670 | 5/1995 | Schmidt | 29/1.32 |
| 5,649,464 | 7/1997 | Gracey | 408/224 |

FOREIGN PATENT DOCUMENTS 269505  11/1990  Japan ...................... 82/113

OTHER PUBLICATIONS

U.S. Patent Application Ser. No. 08/574,277, filed Dec. 18, 1995, by Doyle D. Gracey entitled "Outside Neck Shaver".

*Primary Examiner*—Daniel W. Howell
*Attorney, Agent, or Firm*—Kenneth G. Pritchard

[57] ABSTRACT

A shaver for cartridge case necks indexes on the shoulder of the case and permits a rotating cutter assembly to shave the neck of cartridge cases at optimum cutting angles by round cutters while a pilot end from the same shaft rotating the cutter assembly supports the case neck.

8 Claims, 2 Drawing Sheets

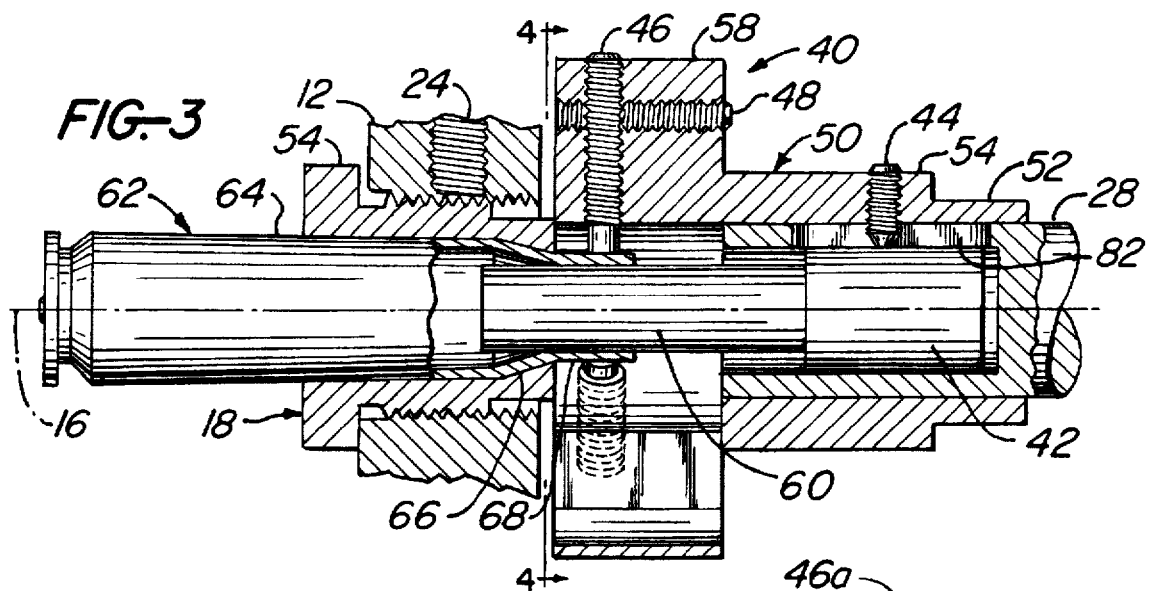
FIG.-3
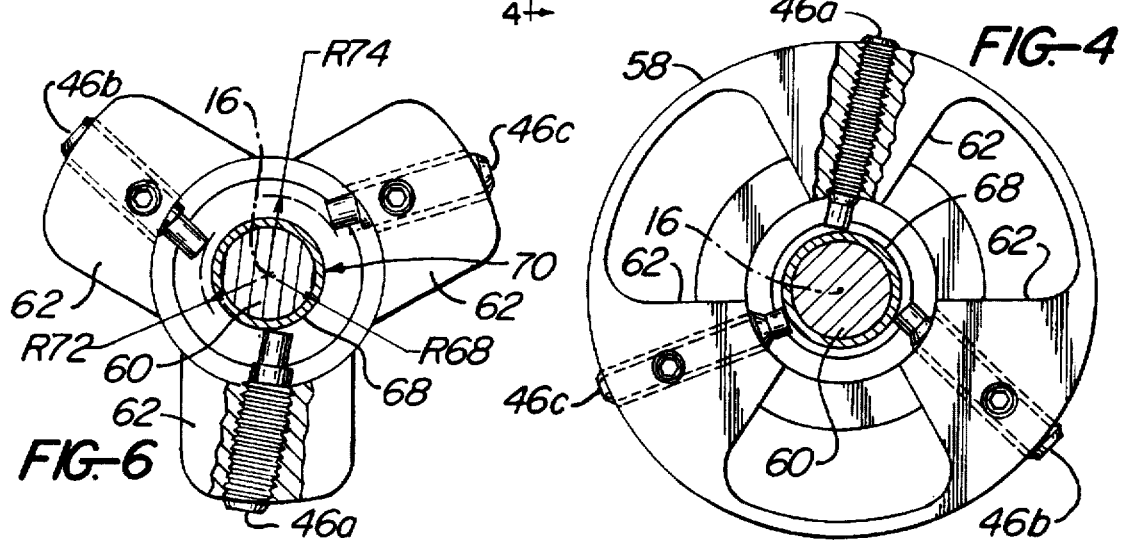
FIG.-6  FIG.-4
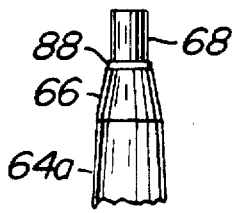  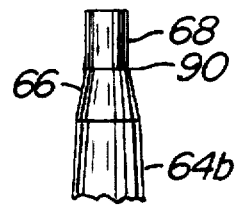  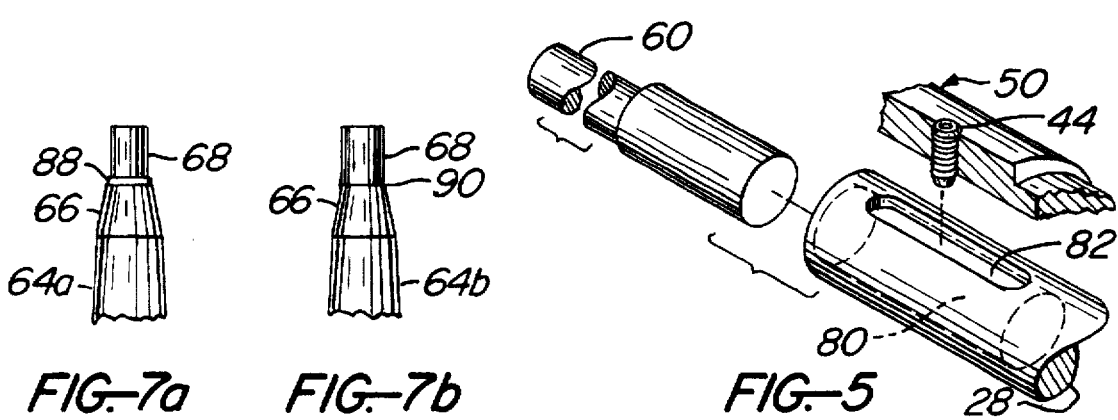
FIG.-7a  FIG.-7b  FIG.-5

CARTRIDGE CASE OUTSIDE NECK SHAVER

BACKGROUND OF THE INVENTION

1. Field of the Invention

This invention relates to devices which can reduce the wall thickness of new or spent cartridge cases. Specifically, this invention relates to cartridge case outside neck trimmers that permit the cartridge case neck to be cut by a cutter that approaches the cartridge case neck to be shaved from a nonradial direction.

2. Description of the Prior Art

Cartridge cases are produced in large numbers. This gives both production and cost efficiency. As part of this process, the necks of the cartridge cases are produced with uniform thickness. Case necks are normally reamed when cases are downsized because the case is forced to match outside dimensions and then reamed so the bullet will fit. The case neck is then cut off to form a flat surface ring around the open end of the cartridge case neck. When a cartridge is fired, the case expands and in particular the cartridge neck expands as the bullet is released due to the internal pressure. The entire case is reshaped and the stretched metal of the neck is converted into extra length of the cartridge case neck. The length is then cut off to the required length and the cartridge is reused. In general the thickness of the cartridge case neck is about 0.015 inches which is an industry standard.

There is a problem with these methods of manufacture and reusing cartridge cases. The problem is that the outside diameters of the case neck at the open end does not need to be as strong as the wall of the body. This unneeded strength delays the release of the bullet and consumes energy to expand the case neck to release the bullet. If the wall thickness of the case neck is reduced, then less energy is needed to expand the case neck and the bullet is released faster with more of the energy available to propel the bullet. This in part also effects the clearance between the case neck and walls of the weapons firing chamber. Uniform air clearance gives the neck the ability to expand uniformly for smooth release of the bullet from the case neck.

This reduction of the thickness has historically been a custom job performed on the cartridge by holding it at the primer end and turning the neck by bringing a cutter to the neck as the cartridge. This process frequently causes the neck to not be concentric with the body. The cartridge will wobble as it rotates and as the cutter touches the neck this wobble can cause uneven thickness of the case neck wall.

If the case neck wall is not of uniform thickness, one side will release before the rest of the case neck causing the bullet to be accelerated to one side against the chamber and the gun barrel. While the gun barrel and its rifling will correct the path of the bullet, excessive wear of the barrel will occur. Even though the barrel corrects the path of the bullet there is still some residual effect whether tumble or change of spin that results in the bullet deviating from the aimed path. This will result in a wide spread of shots around the aimed path.

There is one known device which shaves or turns case necks while hand holding the cartridge. This device aligns the cutter edge parallel to the shaft of the cartridge case. This device is limited by using a radial direction from the axes of the cartridge case to the outside neck surface. Cartridge case necks have different radial measurements for the size of ammunition being used. For example, .22 caliber is significantly smaller in size than .30 caliber. Parallel cutting to the axis means the cutter is simply raised or lowered to accommodate the different radius of the case to be shaved. While this has been a significant advancement in the art, it is not the optimal cutting angle for a cylindrical surface. These cutting angles are well known but have never been available for hand-held cartridges.

All known prior art devices have a problem in that where the cartridge neck meets the tapered surface to the main body of the cartridge cases is cut leaving a sharp angle rather than a rounded transition. The sharp angle leaves a natural weak point for the cartridge case to fail.

Accordingly it is an object of the present invention to reshape the outside diameter of the case neck by shaving it from an optimal cutting angle while supporting the cartridge case by the open case neck. It is a further object of the invention to accomplish the object while leaving a rounded transition between the cartridge case neck and the tapered surface connecting the neck to the main body.

SUMMARY OF THE INVENTION

In the preferred embodiment of this invention, a base has a bearing housing and case holder housing mounted on the base. The bearing housing supports a shaft. The shaft is attached to a crank or motor at one end. The shaft extends into the case holder housing. The axis of the shaft is aligned to be on the same line as the axis of the case holder housing. The far end, called pilot end, of the shaft from the crank or motor has an outside diameter that is the same as or slightly less than the inside diameter of a cartridge case neck to be shaved.

The pilot end is inserted into the cartridge case neck supporting the case neck while a cutter assembly on the rotating shaft shaves the case neck as the cartridge is inserted into the cartridge case holder.

BRIEF DESCRIPTION OF THE DRAWINGS

FIG. 3 is a sectional view of cutter assembly 40.

FIG. 4 is an end view of cutter assembly 40.

FIG. 5 is an exploded view of cutter assembly 40, shaft 28, and mandrel 42.

FIG. 6 shows an alternate embodiment of final portion 58 of cutter assembly 40.

FIGS. 7a and 7b show the difference in transition from case neck 68 to tapered surface 66 between prior art devices and the present invention.

DESCRIPTION OF THE PREFERRED EMBODIMENT

Figure 1:
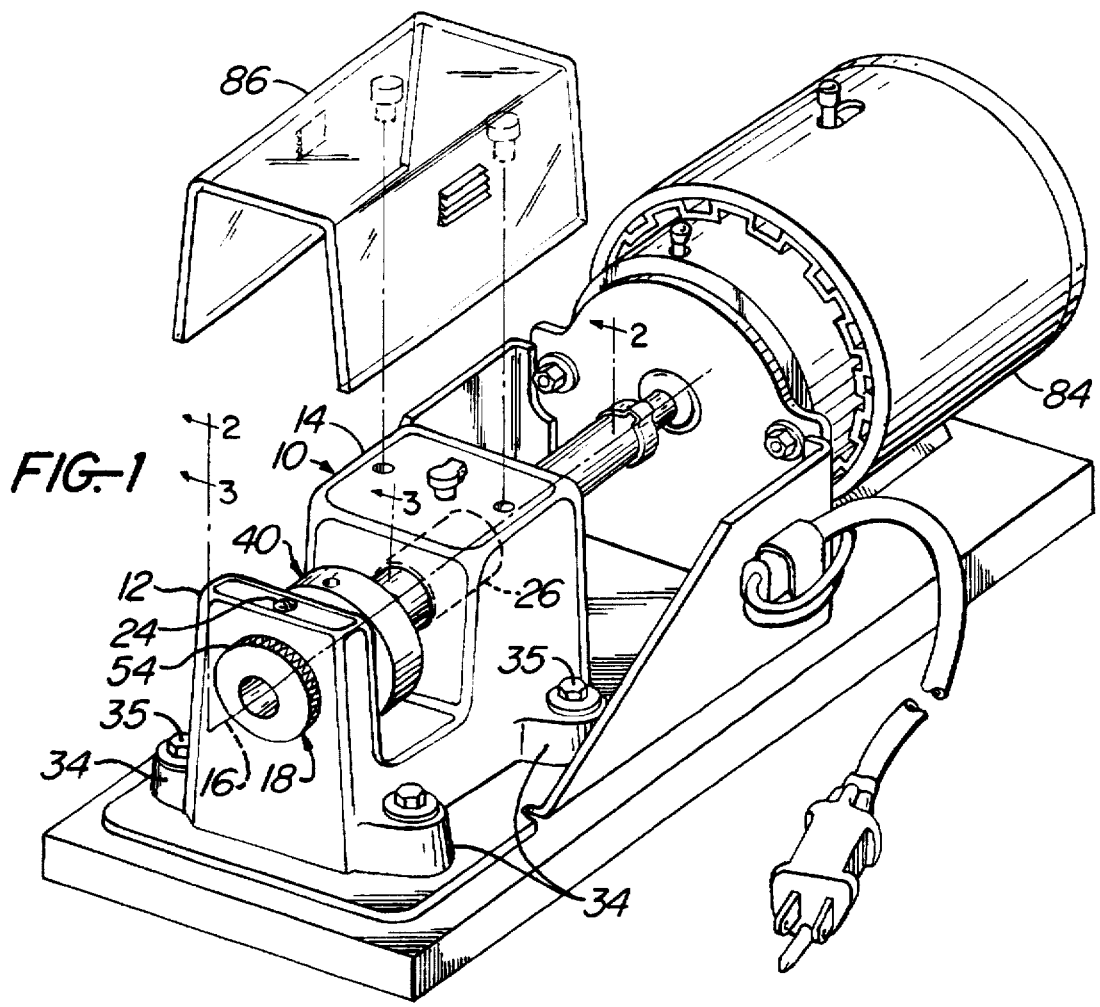
FIG. 1 is a perspective view of the present invention.

FIG. 1 shows a base 10, which may be a block of cast or machined metal such as aluminum. Attached to base 10 either by casting or other suitable means is a cartridge case holder housing 12 and a bearing housing 14 which are axially aligned with each other along axis 16 as shown. Within case holder housing 12, a case holder 18 is mounted. A set screw 24 may be used to lock case holder 18 in position. Within bearing housing 14, a bearing 26 is mounted in any of the known ways to mount a bearing. Base 10 has ears 34 for bench bolts 35. Ears 34 may be shaped as desired. Bench bolts 35 allow base 10 to be rigidly mounted to a bench or other working platform. To this point everything is known prior art.

Figure 2:
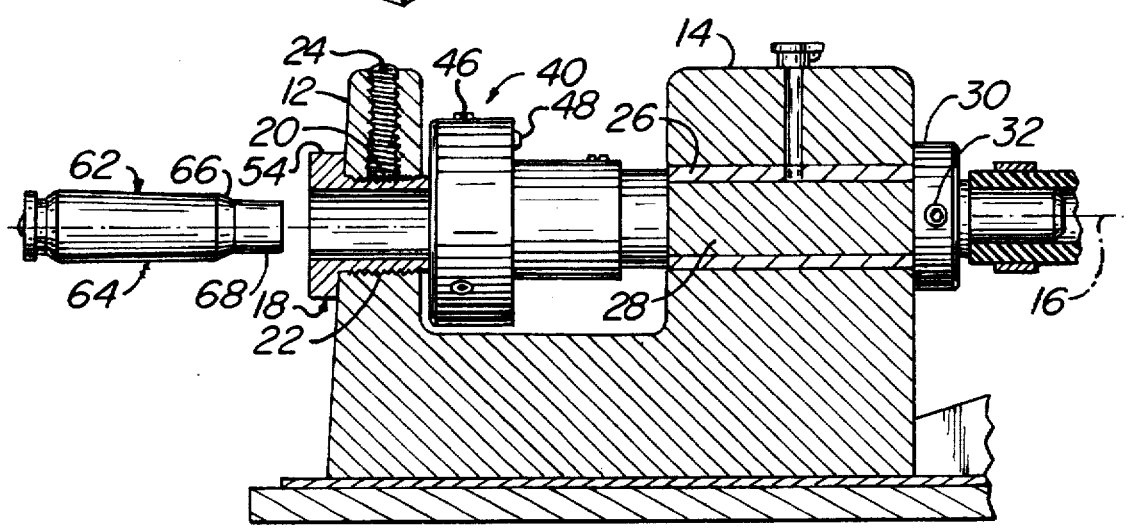
FIG. 2 is a cutaway view of a case holder of the present invention.

In FIG. 2 a cross sectional view of case holder 18 is shown. Threads 20 are shown on case holder 18 which are matched to threads 22 of case holder housing 12. Threads 20 and 22 permit case holder 18 to be set with great precision. In addition to mounting threads 20, a knurled surface grip 54, also shown in FIG. 1, may be added for ease in screwing case holder 18 into or out of case holder housing 12. A shaft 28 is mounted within bearing 26 and held in place by a shaft retainer 30 via a set screw 32, such that it is free to rotate. Shaft retainer 30 may be changed for any means for holding shaft 28 in place. As shaft 28 wears within bearing 26, adjusting shaft retainer 30 forward will maintain a snug fit. If shaft 28 is a harder substance than bearing 26, it is bearing 26 that wears away.

Shaft 28 has one end hollowed out. Around the hollowed out portion of shaft 28 a cutter assembly 40 is mounted on shaft 28. Within the hollowed out portion of shaft 28 a mandrel 42 is inserted, all of which are axially aligned along axis 16. A set screw 44 may be used to lock cutter assembly 40 to mandrel 42. This is accomplished via a slot 82 cut parallel to axis 16 in shaft 28. Set screw 44 passes through the slot of shaft 28 thus locking all three together when shaft 28 rotates. A round cutter 46, which is part of cutter assembly 40 is spaced a preset distance from the surface of mandrel 42. Round cutter 46 is held in place by a set screw 48 such as 10-32×⅛ or any other appropriate fastener. Mandrel 42 serves as a pilot end with an outside diameter the same or just slightly smaller then the inside case neck diameter of a predetermined cartridge size. If cutter 46 is round then a smooth curved transition between the case neck 68 and tapered surface 66 is left.

Mandrel 42 has a pilot end 60 which protrudes from cutter assembly 40. Pilot end 60 may or may not be the same diameter as the rest of mandrel 42. Pilot end 60 is of an outside diameter that is the same or slightly smaller than the inside diameter of the neck 68 of cartridge case 62. Cartridge case 62 has a main body 64 and a tapered surface 66 to neck 68. Case holder 18 has an interior shoulder stop that limits the distance cartridge case 62 may be inserted into case holder 18. The interior dimension of case holder 18 is the same or slightly larger than the exterior dimension of main body 64. Pilot end 60 has a length less than the length of cartridge case 62. Cartridge case 62 thus fits snugly into case holder 18 with neck 68 protruding into cutter assembly 40. Pilot end 60 in turn is a snug fit within cartridge case neck 68. Thus, when cartridge case 62 is inserted it is firmly supported to avoid wobble.

FIG. 3 is a sectional view of cutter assembly 40. Cutter assembly 40 has a hollow mounting shaft 50 which is shown stepped to two different thicknesses in portion 52 and portion 54. The interior dimension of cylindrically hollowed out mounting shaft 50 is the same or slightly greater than the external or largest diameter of shaft 28 which fits within mounting shaft 50. Mounting shaft has a smaller thickness for portion 52 to reduce the mass placed on shaft 28 and the resultant load when shaft 28 rotates. Portion 54 is of greater thickness to provide adequate support for set screw 44 which is threaded through the hold mandrel 42. A final portion 58 is attached to portion 54 and may have multiple cutters 46 such as three cutters 46a, 46b, and 46c. Three cutters are shown only for sake of example and more or less could be mounted in final portion 58. Round cutters 46 may be made of circular hard metal set screws. Being circular they will not leave sharp angles between neck 68 and tapered surface 66.

It is obvious that portions 52, 54, and 58 may be made out of a single piece of metal machined to the relevant dimensions. Final portion 58 may be made of a ring 60 with a plurality of mounting blocks 62, one mounting block for each cutter. Of course multiple cutters are not needed as a single round cutter may be moved in the mounting blocks since a cutter may only be used from one mounting block 62. This is also a practical alternative as the same circular or round cutter will present different aspects when used in different mounting blocks. The chance that the exact portion of the same cutter head would be used when changed to a different caliber setting, that is a different mounting block 62, is a remote possibility.

FIG. 4 is an end view of cutter assembly 40. Ring 60 with three mounting blocks 62 are shown. The number of mounting blocks can vary from one to as many will fit within ring 60. Case neck 68 is shown inserted about axis 16. The thickness and surface irregularities are exaggerated for purposes of example. Arbitrarily a small caliber case neck is shown. Ideally the outer surface is a circle 70. Case neck 68 has a radius curvature R68. A cutter 46a, which can be made of a hard metal set screw, is screwed through mounting block 62 until it makes contact with case neck 68. Note the cutter approaches from a predetermined angle that is not along a radius from axis 16. This permits cutting at an optimum cutting angle for a cylindrical body of radius R68. If larger caliber case neck 68 are used, the radius of the outer surface may be at circle 72 or circle 74. As can be seen in FIG. 6, cutter 46a crosses circle 72 and circle 74 at different angles than where it meets circle 70. Thus cutter 46a is not useable at optimum cutting angles for larger caliber cartridge case necks. Placing cutter 46b and 46c at unique settings in their individual mounting block 62 permits the proper cutting angle to be used for case neck 68 radii that match circle 72 for cutter 46b or circle 74 for cutter 46c.

FIG. 5 is an exploded view of how cutter assembly 40 and other elements are assembled. Shaft 28 with hollowed out end 80 and slot 82 provide a snug fit for mandrel 42 leaving pilot end 60 protruding. Cutter assembly 40 fits over hollowed out end 80 and fastens firmly to mandrel 42 as previously described.

Referring to FIG. 2 and to FIG. 4 which is an end view, it can be seen that case neck 68 is brought to cutter 46. Shaft 28 is rotated either by a crank, not shown, or a motor 84. Motor 84 may be any power drive. The void between bearing housing 14 and case holder housing 12 may be covered by a cover 86. Cover 86 prevents injury to users caused by small shavings of metal thrown by cutter assembly 40.

FIG. 6 shows an alternate embodiment of final portion 58 of cutter assembly 40. In this embodiment mounting blocks 62 connect directly to hollow mounting shaft 50 without the need for ring 58 of FIG. 3 and FIG. 4 to provide support. The plurality of mounting blocks 62 shown are shown symmetrically to avoid problems of uneven loading as cutter assembly 40 rotates.

FIGS. 7a and 7b show the portion of two cartridge cases 64a and 64b. Cartridge case 64a has a point 88 which is a sharp angle rim created by prior art devices. Point 88 becomes a weak spot for cartridge case 64a which encourages case failure. Cartridge case 64b has a rounded transition 90 between tapered surface 66 an case neck 68. The current invention by using rounded cutters at optimal angles leaves this smooth curve or rounded transition 90 which is not a structural weak spot.

What is claimed is:

1. An outside neck shaver for cartridge cases with a predetermined inside case neck diameter comprising:

a base;

a bearing housing mounted to said base;

a shaft inserted into said bearing housing such that one end of said shaft extends from one side of said bearing housing and the other end of said shaft with an outside diameter no greater than the inside diameter of said predetermined inside case neck diameter extends from the other side of said bearing housing;

a case holder housing mounted to said base within an opening axially aligned with said shaft and having said outside diameter shaft end which is no greater than said predetermined inside case neck diameter inserted within said case holder housing along said axis;

a cartridge case holder mounted within said case holder housing and axially aligned around said inserted shaft and with an opening shaped to match said cartridge case's external dimensions and a shoulder stop for indexing on the shoulder of said cartridge case;

means for turning said shaft; and a cutter assembly mounted on said shaft, said cutter assembly further comprising a hollow mounting shaft, at least one mounting block attached to said mounting shaft, a round cutter oriented within said mounting block such that said round cutter will shave the outside of said cartridge case neck at an optimum cutting angle and means for locking said round cutter within said mounting block so as to shave said cartridge case neck to a predetermined thickness.

2. An outside neck shaver for cartridge cases as described in claim 1 further comprising a guard mounted over said cutter assembly to catch any shavings thrown off by said round cutter.

3. An outside neck shaver for cartridge cases as described in claim 1 where said turning means is a motor.

4. An outside neck shaver for cartridge cases as described in claim 2 where said turning means is a motor.

5. An outside neck shaver for cartridge cases with a predetermined inside case neck diameter comprising:

a base;

a bearing housing mounted to said base;

a shaft inserted into said bearing housing such that one end of said shaft extends from one side of said bearing housing and the other end of said shaft with an outside diameter no greater than the inside diameter of said predetermined inside case neck diameter extends from the other side of said bearing housing;

a case holder housing mounted to said base within an opening axially aligned with said shaft and having said outside diameter shaft end which is no greater than said predetermined inside case neck diameter inserted within said case holder housing along said axis;

a cartridge case holder mounted within said case holder housing and axially aligned around said inserted shaft and with an opening shaped to match said cartridge case's external dimensions and a shoulder stop for indexing on the shoulder of said cartridge case;

means for turning said shaft; and a cutter assembly mounted on said shaft, said cutter assembly further comprising a hollow mounting shaft; a ring attached to said mounting shaft; three mounting blocks each attached to said ring; three round cutters, one each in said mounting blocks, each round cutter with a unique orientation within its mounting block such that each cutter has an optimum cutting angle for a predetermined caliber of cartridge case; and means for locking each round cutter within its mounting block.

6. An outside neck shaver for cartridge cases as described in claim 5 further comprising a guard mounted over said cutter assembly to catch any shavings thrown off by said round cutter.

7. An outside neck shaver for cartridge cases as described in claim 5 where said turning means is a motor.

8. An outside neck shaver for cartridge cases as described in claim 6 where said turning means is a motor.

* * * * *